US005944924A

United States Patent [19]

Engle et al.

[11] Patent Number: 5,944,924

[45] Date of Patent: Aug. 31, 1999

[54] ULTRASONIC CUTTING APPARATUS AND METHOD

[75] Inventors: Robert G. Engle; Wendy A. Foster, both of Rochester; Fugui He, Penfield; Douglas G. Maley, Rochester; Harold Moore, Pittsford; David J. Regan, Henrietta, all of N.Y.

[73] Assignee: Eastman Kodak Company, Rochester, N.Y.

[21] Appl. No.: 08/960,310

[22] Filed: Oct. 29, 1997

Related U.S. Application Data

[62] Division of application No. 08/681,256, Jul. 22, 1996, Pat. No. 5,785,806.

[51] Int. Cl.[6] .............................. B62D 1/00; B32B 1/00; B32B 31/18

[52] U.S. Cl. ........................ 156/73.3; 156/73.1; 156/251; 83/21; 83/956

[58] Field of Search ............................ 156/73.3, 580.2, 156/73.1, 25.1, 250, 267, 257, 268; 83/557, 563, 658, 956, 21, 36, 46, 48

[56] References Cited

U.S. PATENT DOCUMENTS

| | | | |
|---|---|---|---|
| 3,756,900 | 9/1973 | Michel . | |
| 3,852,144 | 12/1974 | Parry . | |
| 4,157,719 | 6/1979 | DeWoskin . | |
| 4,158,584 | 6/1979 | Clarke et al. . | |
| 4,227,959 | 10/1980 | Brown . | |
| 4,277,996 | 7/1981 | Sengler . | |
| 4,286,490 | 9/1981 | Spengler . | |
| 4,410,383 | 10/1983 | Lipari . | |
| 4,491,491 | 1/1985 | Stumpf . | |
| 4,623,420 | 11/1986 | Hinkley . | |
| 4,867,815 | 9/1989 | Hoffacker et al. . | |
| 5,183,523 | 2/1993 | Rinehart et al. | 156/73.1 |
| 5,226,343 | 7/1993 | Rawson et al. . | |
| 5,228,372 | 7/1993 | Harrop et al. . | |
| 5,308,009 | 5/1994 | Mizuno . | |
| 5,356,682 | 10/1994 | Stewart et al. . | |
| 5,368,464 | 11/1994 | Stewart et al. | 156/73.1 |
| 5,447,588 | 9/1995 | Merz et al. . | |
| 5,512,132 | 4/1996 | Stewart et al. . | |

FOREIGN PATENT DOCUMENTS

| | | |
|---|---|---|
| 3528910 | 2/1987 | Germany . |
| 3804571 | 8/1989 | Germany . |
| 1-282540 | 11/1989 | Japan . |
| 2-058046 | 2/1990 | Japan . |

*Primary Examiner*—Richard Crispino
*Attorney, Agent, or Firm*—Susan L. Parulski

[57] ABSTRACT

An ultrasonic apparatus and method for cutting a non-planar workpiece. The apparatus includes an anvil having a non-planar surface for closely engaging an underside of the workpiece. An ultrasonic horn has a non-planar cutting surface closely receiving a topside of the workpiece, wherein the cutting surface and the support surface have complementary non-planar shapes. The ultrasonic horn resonates at a predetermined frequency effect cutting of the workpiece. If the workpiece has a heat fusible component, the workpiece can also be seamed.

7 Claims, 6 Drawing Sheets

ULTRASONIC CUTTING APPARATUS AND METHOD

This is a Divisional of U.S. application Ser. No. 08/681,256, filed Jul. 22, 1996, now U.S. Pat. No. 5,785,806.

FIELD OF THE INVENTION

The invention relates to ultrasonic cutting. More particularly, the invention relates to an apparatus and method for ultrasonically cutting a non-planar three-dimensional workpiece, such as thermoplastic light-lock materials.

BACKGROUND OF THE INVENTION

Ultrasonic apparatus have been used to perform cutting operations on a workpiece. In an ultrasonic cutting apparatus, a cutting tool is connected to an ultrasonic vibrating device and vibrated to cut the workpiece. U.S. Pat. No. 5,228,372 relates to an ultrasonic cutting device including an ultrasonic vibrating device and an elongated cutting blade. U.S. Pat. No. 3,852,144 relates to an ultrasonic seaming and cutting apparatus accommodating different workpiece thickness. U.S. Pat. No. 4,491,491 relates to an ultrasonic separation apparatus which provides simultaneous cutting and sealing of thermoplastic materials.

The workpiece may be a textile fabric, paper, plastic sheet or the like; the workpiece being a single or multiple layer sheet material having a planar cross-sectional shape. If the workpiece has at least some fibers being thermoplastic components, the ultrasonic apparatus can provide a seam along a salvage of the workpiece. Prior art apparatus have been used for simultaneously cutting and seaming the edges formed by the cut. For a workpiece of textile fabric which releases large quantities of monofilament fibers, such as velvet, such simultaneous cutting and seaming reduces the amount of loose filaments which occur during cutting.

In the manufacture of 35 mm film cartridge, a plush velvet material is disposed at the opening of the film cartridge for use as a light-lock. Cutting the velvet by means other than ultrasonic means, such as by a rotating knife, causes loose fibers to contaminate the work environment, and results in a loss of material from lack of width control. In addition, a product quality problem may result if the loose fibers adhere to the 35 mm film. Further, if an adhesive backing is applied to the velvet, the rotating knife is adversely affected by the adhesive. However, the plush velvet material disposed at the opening of the film cartridge has a non-planar shape, and difficulty is experienced using conventional ultrasonic means when the workpiece is not of a planar shape.

Accordingly, a need continues to exist for an apparatus which ultrasonically cuts a workpiece having a non-planar shape. Further, such an apparatus should not result in loose fibers and a loss of material.

SUMMARY OF THE INVENTION

An object of the invention is to provide an apparatus which ultrasonically cuts a workpiece having a non-planar shape. If the workpiece has a heat fusible component, such an apparatus can simultaneously cut and seam the workpiece.

Yet another object of the invention is to provide such an apparatus wherein a hard edge is avoided at the cut seam.

Still another object of the invention is to provide such an apparatus wherein the loss of material from cutting and seaming is minimized.

A further object of the invention is to provide such an apparatus which is capable of cutting and seaming a workpiece having an adhesive layer, and such an apparatus is not adversely affected by the adhesive.

Another object of the invention is to provide multiple cutting operations simultaneously.

Still a further object of the invention is to provide multiple cutting operations simultaneously using a composite horn.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an ultrasonic apparatus for cutting a workpiece, the workpiece having a topside, an underside, and a three-dimensional shape which is non-planar. The apparatus includes an anvil or blade having a surface closely engaging the underside of the workpiece to support the workpiece, and an ultrasonic cutter having a cutting surface which meets the topside of the workpiece. The ultrasonic cutter resonates at a predetermined frequency toward and away from the anvil, whereby the workpiece is cut. The ultrasonic cutter and anvil have complementary non-planar shapes. In a further embodiment, the surface of the ultrasonic cutter closely approximates the topside of the workpiece, and the surface of the anvil closely approximates the underside of the workpiece.

According to another aspect of the invention, there is provided an ultrasonic apparatus for generating a plurality of cuts in a non-planar workpiece. The apparatus includes a plurality of anvils, each anvil having a non-planar surface supporting an underside of the workpiece at a location of the workpiece which is to be cut. The apparatus also includes an ultrasonic cutter having a plurality of non-planar cutting surfaces which meet the topside of the workpiece. Each of the plurality of cutting surfaces has a corresponding anvil surface, with each cutting surface and its corresponding anvil surface having complementary non-planar shapes. The ultrasonic cutter is adapted to resonate at a predetermined frequency toward and away from the plurality of anvils to effect cutting of the workpiece.

According to a further aspect of the invention, there is provided a method for ultrasonically cutting a non-planar workpiece. The method includes supporting an underside of the non-planar workpiece with a non-planar anvil surface. A topside of the non-planar workpiece is closely received by a non-planar cutting surface of an ultrasonic horn, with the cutting surface and the anvil surface having complementary non-planar shapes. The ultrasonic horn is resonated at a predetermined frequency toward and away from the anvil surface in a plane extending through the workpiece, anvil surface, and ultrasonic horn. The vibration coupled into the workpiece, and under pressure from the anvil, effects cutting of the workpiece. In another embodiment of the invention, if the workpiece has a heat fusible component, the method further comprises the step of seaming the edges of the workpiece that are cut.

According to yet another aspect of the invention, there is provided a method for generating a plurality of cuts in a non-planar workpiece, each workpiece having a topside and an underside. An underside of the non-planar workpiece is supported with a plurality of non-planar anvil surfaces, and a topside of the non-planar workpiece is closely received by a plurality of non-planar cutting surfaces of an ultrasonic horn. Each of the plurality of cutting surfaces is associated with one of the plurality of anvil surfaces, with each of the cutting surfaces and the associated anvil surfaces having complementary non-planar shapes. The ultrasonic horn is resonated at a predetermined frequency to move the cutting surfaces toward and away from the associated anvil surfaces in a plane extending through the workpiece, anvil surface, and ultrasonic horn thereby cutting the workpiece to form a plurality of cut edges. If the workpiece includes a heat fusible component, the cut edges of the workpiece are seamed.

The apparatus of the present invention ultrasonically cuts a workpiece having a non-planar shape. If the workpiece has a heat fusible component, the apparatus cuts and seams the workpiece, thereby reducing loose fibers. With such an apparatus, a hard edge is avoided at the seam, and the loss of material from cutting and seaming is minimized. With such a cutting method, an adhesive layer coated to the workpiece does not adversely affect the cutting tool.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
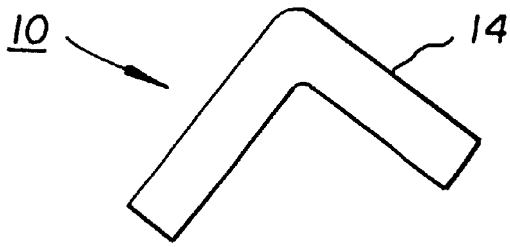
FIG. 1 shows a side view of a non-planar workpiece.

The following is a detailed description of the preferred embodiments of the invention, reference being made to the drawings in which the same reference numerals identify the same elements of structure in each of the several figures.

FIG. 1 illustrates a workpiece 10, having a non-planar shape, which is to be cut using the ultrasonic apparatus of the present invention. Workpiece 10 is comprised of a material 14 which can be a textile fabric, woven material, thin film, or plastic material, and may include knitted woven and non-woven materials such as nylon, polyester, polypropylene, modified acrylics, vinyls, urethane, and synthetic blends. If material 14 includes a heat fusible component, such as a thermoplastic material, the material can be seamed using the apparatus of the present invention.

Figure 2:
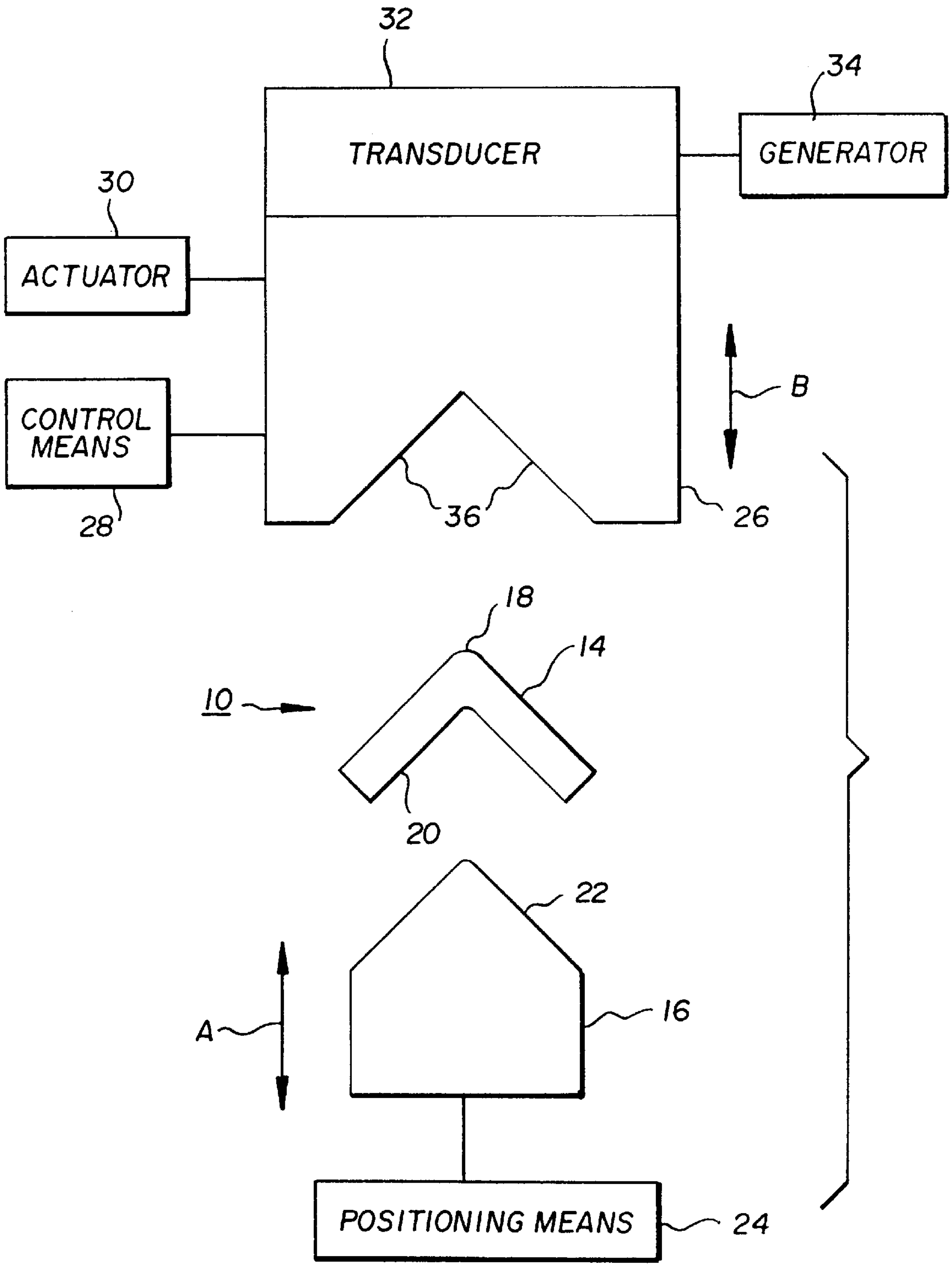
FIG. 2 shows a side view of the ultrasonic apparatus according to the present invention.

The ultrasonic apparatus of the present invention is broadly illustrated in FIG. 2. An anvil 16 is disposed on one side of workpiece 10. In such an orientation, workpiece 10 has a topside 18 directed away from anvil 16 and an underside 20 directed toward anvil 16. Anvil 16 includes a surface 22 which supports and engages material 14. Positioning means 24 controls the position of anvil 16, for translational movement in a direction shown by arrow A.

An ultrasonic horn 26, also known an ultrasonic cutter, resonator, tool, or cutting tool, is controlled by control means 28 and an actuator 30 for translational movement of horn 26 in a direction toward and away from workpiece 10, illustrated by arrow B. Ultrasonic horn 26 is driven by a transducer 32. A generator 34 creates a high frequency, typically 20 kHz, electrical excitation. This excitation is sent to transducer 32 which converts the electrical excitation into longitudinal, low amplitude mechanical vibrations. The mechanical vibrations are transmitted to horn 26 and coupled to workpiece 10 in the direction illustrated by arrow B. Horn 26 includes a cutting surface 36 configured to meet and closely receive material 14. Horn 26 resonates or vibrates at a predetermined frequency toward and away from anvil 16, in a plane extending through workpiece 10, anvil 16, and ultrasonic horn 26 to cut the workpiece.

The configuration of cutting surface 36 of horn 26 and support surface 22 of anvil 16 is such that they have complementary non-planar shapes. That is, cutting surface 36 and support surface 22 have a mating male and female configuration. Topside 18 of workpiece 10 has a similar configuration to cutting surface 36, whereby cutting surface 36 of horn 26 closely approximates the topside of workpiece 10. Similarly, underside 20 of workpiece 10 has a similar configuration to anvil surface 22, whereby anvil surface 22 closely approximates underside 20.

In operation, anvil 16 is positioned in a retracted position, directed away from workpiece 10. Positioning means 24 moves anvil 16 toward horn 26 to position workpiece 10 in its operation position whereby anvil 16 closely receives the material to support the workpiece. In this operational position, positioning means 24 resiliently biases or urges workpiece 10 toward horn 26. Anvil 16 is positioned to direct or extend material 14 toward horn 26, whereby the material deforms to the shape of anvil surface 22, dependent on the material characteristics (e.g., material thickness, flexibility). Actuator 30 moves horn 26 toward anvil 16, without vibration, whereby horn 26 contacts or is closely spaced from workpiece 10. Control means 28 triggers the vibration of horn 26, whereby horn 26 resonates toward and away from anvil 16 to cut the material. Once the cutting operation is complete, anvil 16 and horn 26 are moved away from workpiece 10, and workpiece 10 is removed from support surface 22. The cutting cycle can then be repeated for another workpiece.

EXAMPLE

Single Cutting Operation

Figure 3:
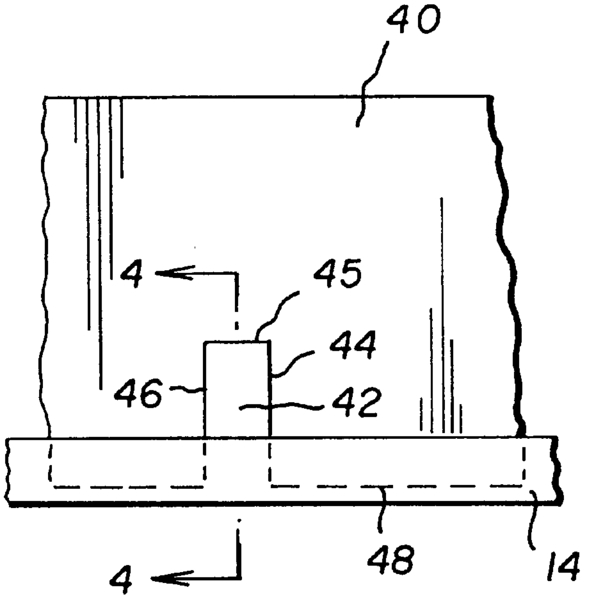
FIG. 3 shows a top view of a portion of the non-planar workpiece and support member in accordance with the present invention.
Figure 4:
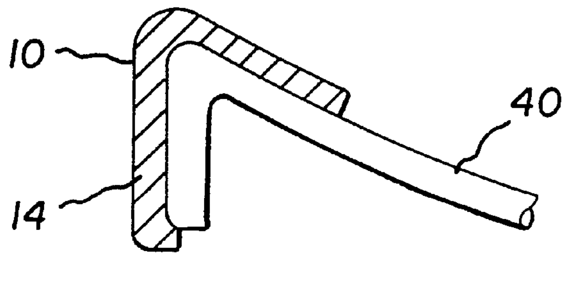
FIG. 4 shows a cross-sectional view of the non-planar workpiece and support member taken along Line 4—4 of FIG. 3.

Workpiece 10 may be attached to a support member prior to the cutting operation by the ultrasonic apparatus of the present invention. FIGS. 3 and 4 illustrate a portion of non-planar workpiece 10 comprising material 14 affixed to a rigid, non-planar support member 40 made of steel or the like. Workpiece 10 may be adhered to support member 40 for example by an adhesive or hot glue. Support member 40 is not cut using the ultrasonic apparatus of the present invention; only material 14 is cut. Rather, support member 40 may provide a frame or support structure by which to orient workpiece 10 in a non-planar shape, particularly if material 14 is flexible.

As illustrated in FIG. 3, support member 40 includes a notch or contoured region 42 defined by walls 44,45,46 and front edge 48. Workpiece 10 is adhered to support member 40 along front edge 48, such that workpiece 10 is positioned across the contoured region. The portion of workpiece 10 which is positioned across contoured region 42 is to be cut to separate the material across its width, preferably minimizing the amount of material being lost during the cutting process. In the preferred embodiment, workpiece 10 is a velvet plush which includes a heat fusible component whereby the velvet plush is also seamed. The seaming is essentially a bonding or fusing operation involving the localized heating and fusing of the thermoplastic material. Thus, the cut edge is sealed during and simultaneously with the cutting process, whereby loose fibers or a frayed edges are prevented.

Figure 5:
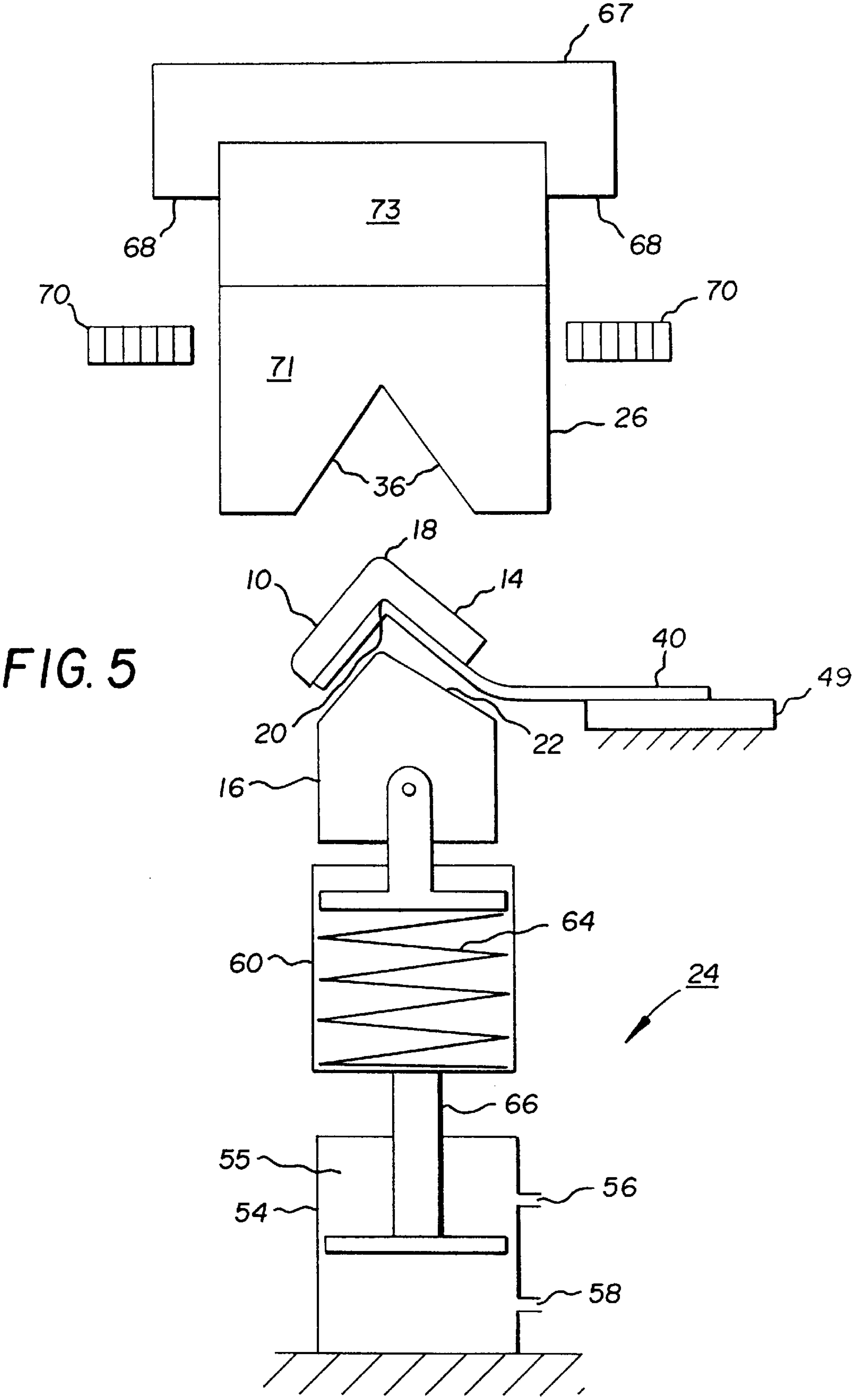
FIG. 5 shows a side view of the ultrasonic apparatus according to the present invention.

The ultrasonic apparatus for this embodiment is broadly illustrated in FIG. 5. Workpiece 10 and support member 40 are supported on a base member 49, with anvil 16 disposed on one side of workpiece 10. In such an orientation, the portion of workpiece 10 disposed within contoured region 42 has topside 18 directed away from anvil 16 and underside 20 directed toward anvil 16. Anvil 16 includes a surface 22 which engages the portion of workpiece 10 within contoured region 42 during the cutting operation. Anvil surface 22 does not contact support member 40, thus, the width of anvil surface 22 is configured to be disposed within contoured region 42. As such, anvil surface 22 supports and cuts workpiece 10 disposed within contoured region 42.

Positioning means 24, adapted to control the position of anvil 16, includes a base 54 having a central chamber 55, a first inlet 56 and a second inlet 58 for introducing and removing air from central chamber 55, a biasing member 60, and a ram 66 rigidly affixed to biasing member 60. A spring member 64, mounted within biasing member 60, is mechanically associated with anvil 16 to resiliently bias anvil 16 toward horn 26. When air is introduced to central chamber 55 through inlets 56,58, ram 66 moves away from or toward workpiece 10, thereby moving biasing member 60 away from or toward, respectively, workpiece 10.

Cutting surface 36 of horn 26 is configured to closely receive workpiece 10 disposed within contoured region 42; horn 26 does not contact support member 40. The configuration of cutting surface 36 of horn 26 and support surface 22 of anvil 16 is such that they have complementary non-planar shapes. That is, cutting surface 36 and support surface 22 have a mating male and female configuration. Topside 18 of workpiece 10 has a similar configuration to cutting surface 36, whereby cutting surface 36 of horn 26 closely approximates the topside of workpiece 10. Similarly, underside 20 of workpiece 10, disposed within contoured region 42, has a similar configuration to anvil surface 22, whereby anvil surface 22 closely approximates underside 20.

A support device 67 affixed to horn 26 has at least one engaging surface 68 adapted to engage at least one mechanical stop 70 to position the horn during operation. Preferably, horn 26 includes two sections: a first section 71 made of a hard material, such as tool steel, which comprises cutting surface 36, and a second section 73 made of a lighter material, such as titanium, allowing the mass of the horn to be reduced.

Figures 6A, 6B, 6C, 6D:
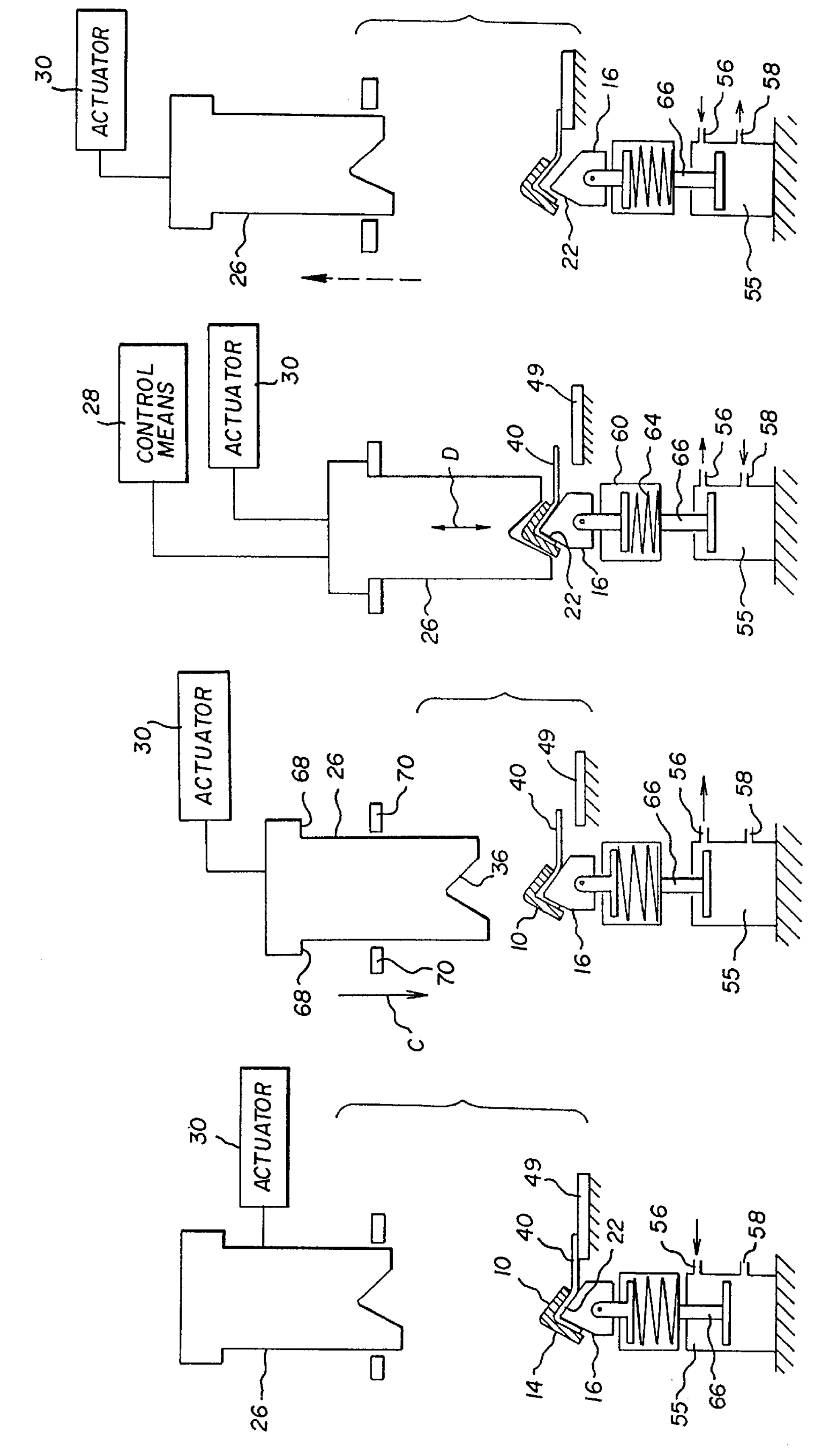
FIG. 6A through 6D shows a method of ultrasonic cutting in accordance with the present invention.

The operation of the ultrasonic cutting apparatus is illustrated in FIGS. 6A through 6D. As illustrated in FIG. 6A, air is introduced into chamber 55 through first inlet 56. In this position, ram 66 retracts, urging anvil 16 away from horn 26. Workpiece 10 and support member 40 are supported on base member 49, with anvil surface 22 closely engaging material 14 disposed across the contoured region.

Referring now to FIG. 6B, the air from chamber 55 is removed through first inlet 56, and introduced into chamber 55 through second inlet 58. Ram 66 moves toward horn 26, thereby directing anvil 16, support member 40, and workpiece 10 toward horn 26. Anvil 16 contacts the portion of workpiece 10 disposed across contoured region 42, and extends the portion toward horn 26, thereby deforming the material to the shape of anvil surface 22 and extending the material away from support member 40. Dependent on the material characteristics (e.g., material thickness, flexibility), the deformation of the material by the anvil positions the material closer to horn 26 than support member 40. This extension of the material away from support member 40 toward horn 26 minimizes the contact area and ensures that horn 26 does not contact support member 40 during the cutting operation.

Actuator 30 is actuated to move horn 26 toward anvil 16, without vibration, as shown by arrow C. As horn 26 moves toward anvil 16, engaging surfaces 68 of horn 26 engage mechanical stop 70 to position the horn for operation. When engaging surface 68 engages mechanical stop 70, horn 26 contacts the portion of workpiece 10 disposed across contoured region 42 such that cutting surface 36 of horn 26 closely receives the topside of the workpiece disposed within contoured region 42. Control means 28 triggers horn 26 to resonate at a predetermined frequency toward and away from anvil 16, as shown by arrow D of FIG. 6C, in a plane extending through the workpiece, anvil, and horn. Such a trigger can occur before or after horn 26 contacts workpiece 10, or simultaneously. As horn 26 resonates, the thermal energy of the vibration causes the temperature of material 14 to increase. Under the pressure from anvil 16, material 14 disposed on anvil surface 22 is cut and the edges are sealed.

Depending on the control means, horn 26 can be resonated for a pre-determined period of time, or reviewed periodically to determine if the cutting operation is complete. In the instant situation, a pre-determined cutting time is utilized, in the range of about 0.2 seconds.

The selection of spring member 64 reflects on the cut quality and the life of the ultrasonic apparatus. A rigid spring member may damage anvil 16, while a soft spring member till not sufficiently support material 14. Accordingly, a suitable spring member 64 is preferably selected by determining an appropriate spring constant.

Referring now to FIG. 6D, when the cutting operation is complete, horn 26 is no longer resonated. Actuator 30 moves horn 26 away from anvil 16. The air in chamber 55 is removed through second inlet 58 and introduced into chamber 55 through first inlet 56, whereby ram 66 is directed away from horn 26. The cut workpiece is removed from anvil surface 22, allowing the cutting cycle to be repeated.

Figure 7:
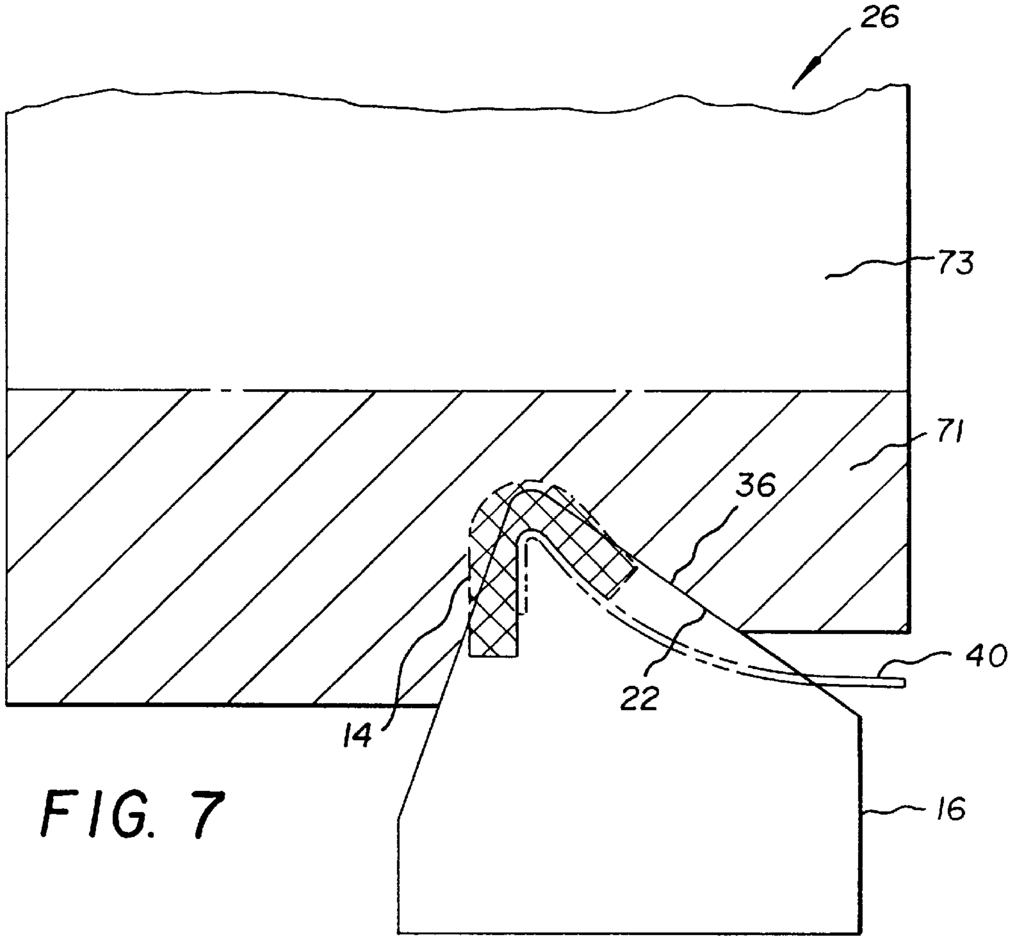
FIG. 7 shows the complementary non-planar cross-sectional shape of the ultrasonic horn and anvil in accordance with the present invention.

FIG. 7 illustrates the association between cutting surface 36 of horn 26 and anvil surface 22. Cutting surface 36 and anvil surface 22 are configured to have complementary non-planar shapes. Further, cutting surface 36 closely approximates the topside of workpiece 10 disposed within contoured region 42, while anvil surface 22 closely approximates the underside of workpiece 10 disposed within contoured region 42.

Applicants have completed a cycle within 0.5 seconds. Those skilled in the art will readily appreciate that adjustments in the pressure, power level, and time may be necessary dependent on the workpiece and the non-planar shape.

EXAMPLE

Multiple Cutting Operations

Figure 8:
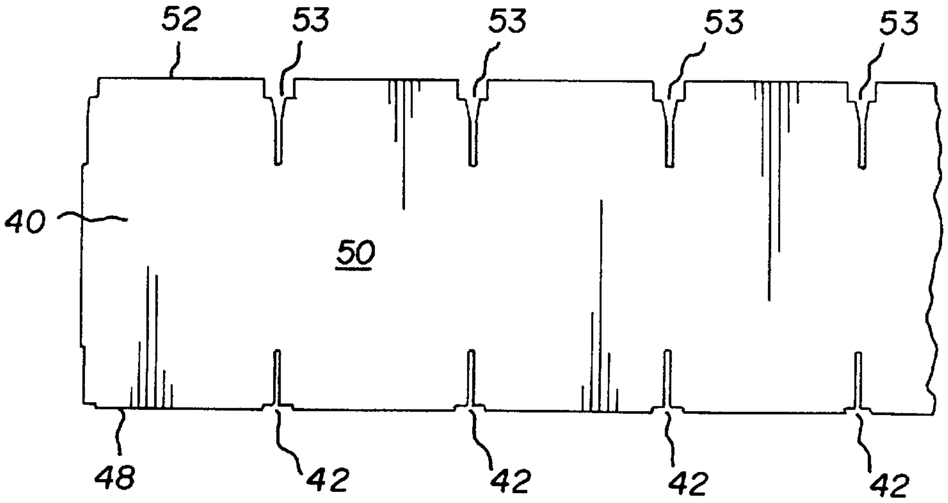
FIG. 8 shows a non-planar sheet comprising several film cartridge blanks.
Figure 9:
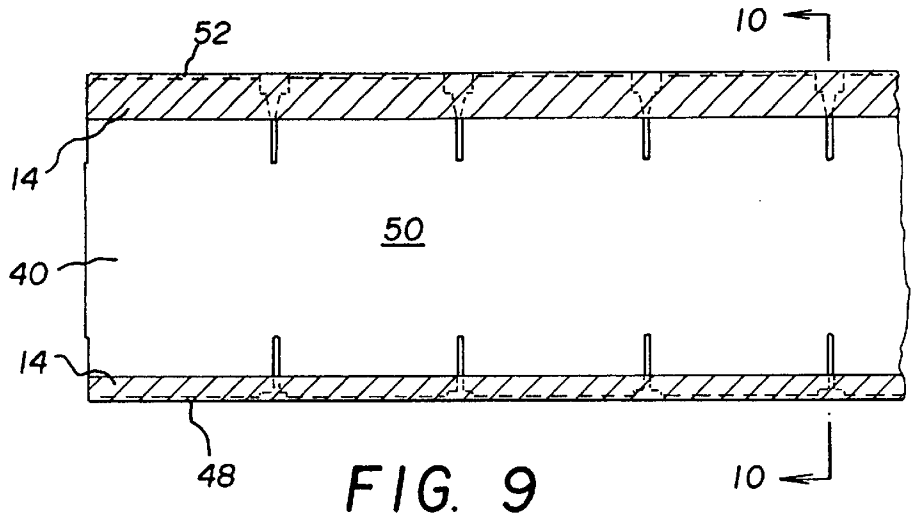
FIG. 9 shows the sheet of FIG. 8 to which a non-planar workpiece is affixed.
Figure 10:
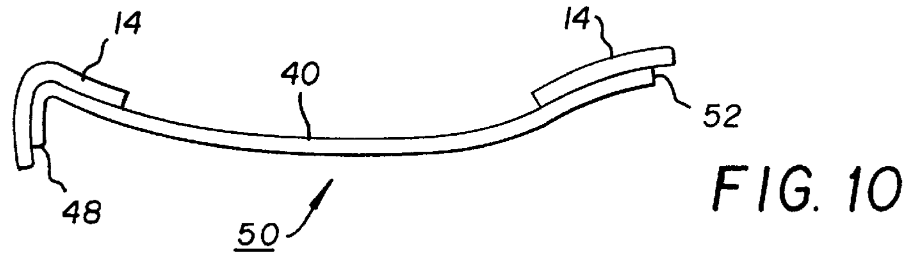
FIG. 10 shows a cross-sectional view of the sheet and non-planar workpiece taken along Line 10—10 of FIG. 9.

The ultrasonic apparatus of the present invention has been applied in the manufacture of film cartridges, for example, 35 mm film cartridges. FIGS. 8 through 10 illustrate a sheet 50 comprising several plates, each plate being designed to form the cylindrical shell of a single 35 mm film cartridge once separated from sheet 50. Sheet 50 includes support member 40, a front edge 48 having contoured region 42, and a back edge 52 having contoured region 53; contoured region 42 may be of a different shape than contoured region 53. Sheet 50 is typically separated across its width at the location of contoured regions 42,53 to form each plate.

Before sheet 50 is separated into individual plates, a continuous strip of material 14 is applied to the front edge 48 of support member 40. Material 14 is usually a plush material having a heat fusible component, such as velvet, coated on the underside with a hot melt glue. For example, by heating the edge of the support member, the contact of the hot melt glue with the heated edge is molten so that the material bonds to the support member and remains bonded thereto after cooling. Similarly, a continuous strip of material 14 can optionally be applied to back edge 52 of support member 40. Since material 14 is applied as a continuous strip, material 14 bridges contoured regions 42,53 of support member 40. Material 14 disposed within contoured regions 42,53 is the workpiece 10 which is cut and seamed using the ultrasonic apparatus of the present invention, after which, sheet 50 is separated into the individual plates, for example, by a punching operation. The individual plates can then be formed into a cylindrical 35 mm film cartridge wherein front edge 48 and back edge 52 form an opening of the film cartridge through which a web of film can extend, the material 14 forming a light-lock at the opening.

As illustrated in FIG. 10, material 14 positioned across contoured region 42,53 has a non-planar shape. Support member 40, on which material 14 is adhered, provides a frame for the non-planar shape of material 14.

Figure 11:
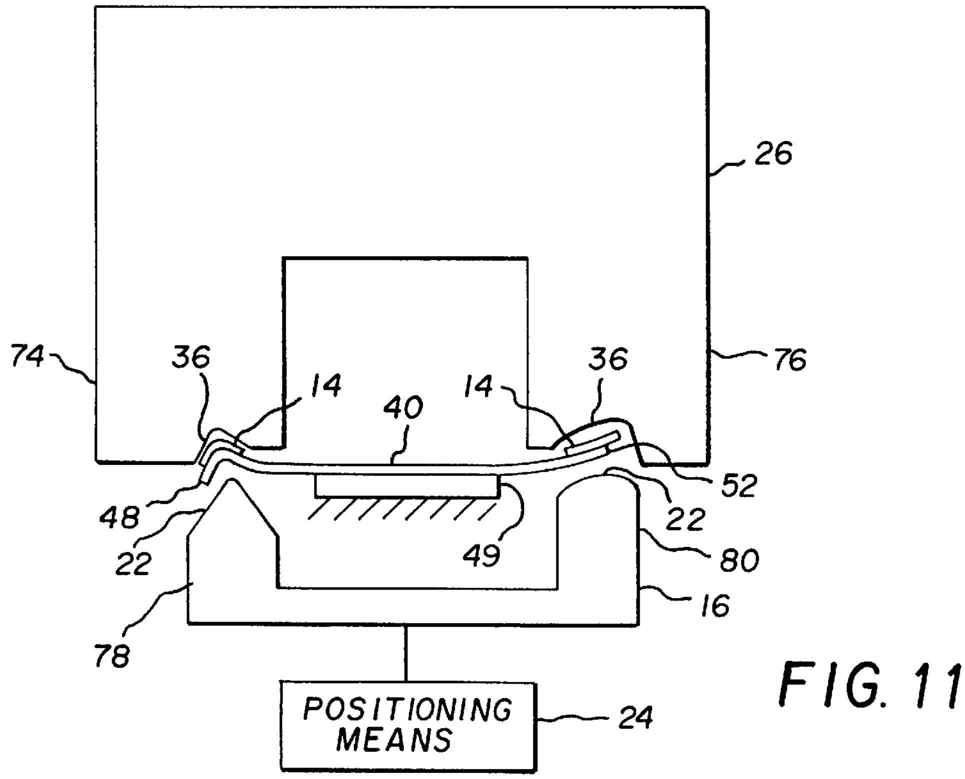
FIG. 11 shows a two-part horn in accordance with the present invention.

In a preferred embodiment, horn 26 comprises a two-part horn, allowing the horn to generate multiple cutting operations simultaneously. As illustrated in FIG. 11, horn 26 includes a first and second horn segment 74,76, respectively, for ultrasonically cutting material 14 positioned at contoured region 42 and contoured region 53, respectively, of sheet 50. Likewise, anvil 16 has a first and second anvil segment 78,80. Accordingly, cutting surface 36 of first horn segment 74 is configured to complement anvil surface 22 of first anvil segment 78. Similarly, cutting surface 36 of second horn segment 76 is configured to complement anvil surface 22 of second anvil segment 80.

Horn 26 illustrated in FIG. 11 may be further modified to generate multiple cuts to sheet 50. For example, referring to FIG. 9, horn 26 may be configured to provide six cutting operations simultaneously; three cuts on the material disposed across three contoured regions 42 and three cuts on the material disposed across three contoured regions 53. With such an example, six anvil segments would be utilized (i.e., three first anvil segments 78 and three second anvil segments 80). The simultaneous multiple cutting operations decrease the manufacturing cycle time.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List

10 workpiece
14 material
16 anvil
18 topside of workpiece
20 underside of workpiece
22 anvil surface
24 positioning means
26 ultrasonic horn
28 control means
30 actuator
32 transducer
34 generator
36 cutting surface
40 rigid support member
42 contoured region
44,45,46 wall
48 front edge
49 base member
50 sheet of material
52 back edge of support member
53 contoured region
54 base
55 chamber
56 first inlet
58 second inlet
60 biasing member
64 spring member
66 ram
67 support device
68 engaging surface
70 mechanical stop
71,73 first and second section of horn, respectively
74,76 first and second horn segment, respectively
78,80 first and second anvil segment, respectively

What is claimed is:

1. A method for ultrasonically cutting a non-planar workpiece, comprising:

supporting an underside of the non-planar workpiece at a cutting area with a non-planar anvil surface;

closely receiving a topside of the non-planar workpiece with a non-planar cutting surface of an ultrasonic horn, the cutting surface and the anvil surface having complementary non-planar shapes;

resonating the ultrasonic horn at a predetermined frequency toward and away from the anvil surface in a plane extending through the workpiece, anvil surface, and ultrasonic horn; and cutting the workpiece.

2. The method according to claim 1 further comprising the step of urging the anvil toward the ultrasonic horn.

3. The method according to claim 1 wherein the anvil is non-stationary.

4. A method for ultrasonically cutting and seaming a non-planar workpiece having a heat fusible component, comprising:

supporting an underside of the non-planar workpiece at a cutting area with a non-planar anvil surface;

closely receiving a topside of the non-planar workpiece with a non-planar cutting surface of an ultrasonic horn, the cutting surface and the anvil surface having complementary non-planar shapes;

resonating the ultrasonic horn at a predetermined frequency toward and away from the anvil surface in a plane extending through the workpiece, anvil surface, and ultrasonic horn;

cutting the workpiece to form a plurality of edges; and seaming the edges of the workpiece.

5. The method according to claim 4 wherein the anvil is non-stationary.

6. A method for generating a plurality of cuts in a non-planar workpiece, each workpiece having a topside and an underside, comprising:

supporting an underside of the non-planar workpiece at a cutting area with a plurality of non-planar anvil surfaces;

closely receiving a topside of the non-planar workpiece with a plurality of non-planar cutting surfaces of an ultrasonic horn, each of the plurality of cutting surfaces being associated with one of the plurality of anvil surfaces, each of the cutting surfaces and the associated anvil surfaces having complementary non-planar shapes;

resonating the ultrasonic horn at a predetermined frequency to move the cutting surfaces toward and away from the associated anvil surfaces in a plane extending through the workpiece, anvil surface, and ultrasonic horn;

cutting the workpiece to form a plurality of cut edges; and seaming the cut edges of the workpiece.

7. The method according to claim 6 further comprising the step of urging the plurality of anvil surfaces toward the ultrasonic horn.

* * * * *